UNITED STATES PATENT OFFICE.

JAMES E. GILLESPIE, OF WARWICK, NEW YORK, ASSIGNOR TO THE FABRIC FIRE HOSE COMPANY, OF SAME PLACE.

MANUFACTURE OF RUBBER-LINED HOSE.

SPECIFICATION forming part of Letters Patent No. 275,638, dated April 10, 1883.

Application filed March 6, 1883. (No specimens.)

*To all whom it may concern:*

Be it known that I, JAMES E. GILLESPIE, of Warwick, in the county of Orange and State of New York, have invented a certain new and useful Improvement in the Manufacture of Rubber-Lined Hose, of which the following is a specification.

In the manufacture of fabric hose having a rubber lining, the lining, after having been made, is coated externally with rubber cement, and after being so prepared is drawn into the fabric tube, or sometimes, where the hose is of small size, the fabric is woven onto or around the rubber lining. After the lining is in place it is common to subject the hose to an internal pressure of steam or other fluid of a temperature sufficient to soften the cement with which the rubber lining is coated, and of a pressure sufficient to cause the lining to completely fill the fabric tube and to produce the adhesion of the lining throughout its extent to the fabric. The rubber cement employed is necessarily very sticky, and as the lining has been made in pieces of great length and folded or rolled up in order to handle it, its folds have been liable to adhere together and cause great trouble if allowed to come in contact. To prevent this it is now customary to fold the lining-tube as it is coated with cement in an apron of cotton cloth or other material, to prevent its folds from coming in contact with each other.

The object of my invention is to obviate the necessity of using such an apron or cloth; and the invention consists in coating the lining-tube with shellac varnish, or an alcoholic solution of shellac, after it has received its coating of cement. The coating of shellac enables the lining-tube to be handled and folded or laid on itself without danger of its surfaces sticking together.

In carrying out my invention I make a solution of about one pound of gum-shellac in one gallon of alcohol or wood-spirits, and after the rubber cement has been applied in the usual way I coat the lining over all its cemented surface with this solution of shellac. The shellac is applied with a brush, or the lining may be passed or drawn through a vat containing the solution, or the solution may be applied in any other suitable manner.

I do not confine myself to the proportions of shellac and alcohol or wood-spirits above named, as they may be widely varied, if desirable.

The lining coated with cement and with shellac is drawn into the fabric tube in the usual way, or the fabric tube may be woven around or onto the lining if the latter is of small size.

Although this coating of shellac prevents the lining from sticking while being handled, I have found that it does not interfere with the action or function of the cement when the lining is subjected to internal heat and pressure, and the union or adhesion of the fabric and lining tubes is very nearly if not quite as perfect where the cement is coated with shellac as it is where the cement is left bare.

By my invention I obviate the necessity of using the cloth apron to wrap or fold the lining in, and enable it to be handled as readily as if it were not cemented.

What I claim as my invention, and desire to secure by Letters Patent, is—

The improvement in the manufacture of rubber-lined hose, consisting in coating the lining-tube with shellac varnish or a solution of shellac in alcohol after it has been coated with cement, substantially as and for the purpose herein described.

JAMES E. GILLESPIE.

Witnesses:
    FREDK. HAYNES,
    ED. L. MORAN.